Patented Apr. 28, 1925.

1,535,798

UNITED STATES PATENT OFFICE.

LEONARD WICKENDEN, OF FLUSHING, NEW YORK, ASSIGNOR TO INDUSTRIAL CHEMICAL COMPANY, OF NEW YORK, N. Y., A CORPORATION OF NEW YORK.

DECOLORIZING CARBON AND PROCESS OF PRODUCING THE SAME.

No Drawing.  Application filed August 16, 1919. Serial No. 318,048.

*To all whom it may concern:*

Be it known that I, LEONARD WICKENDEN, a subject of the King of Great Britain, and resident of Flushing, Queens County, State of New York, have made certain new and useful Inventions Relating to Decolorizing Carbons and Processes of Producing the Same, of which the following is a specification.

This invention relates especially to decolorizing carbons for use in decolorizing organic liquids or solutions and to processes of producing such decolorizing carbons preferably from highly porous amorphous carbonaceous materials, such, for instance, as porous carbonized dissolved woody material of the general character of the caustic soda waste liquor from the caustic wood pulp process. Such porous carbonaceous material may advantageously be treated with dissolved protective material, such as a solution of chlorides or other neutral or acid salts of iron, manganese, magnesium or aluminum, the metallic radicals of these salts being apparently adsorbed or deposited upon or within the porous carbonaceous material which can then be dried and calcined at temperatures of 800° to 1000° centigrade more or less, in the presence of limited quantities of air or other oxidizing gases which greatly increases the decolorizing action of the materials.

Suitable porous carbonized material made largely or wholly from dissolved organic substances may be used in this process and thereby very decidedly increased in its decolorizing power and value. In the manufacture of paper from wood or the like by the caustic soda process the digestion of the wood chips in the caustic soda cooking liquor produces in addition to the insoluble cellulose a solution of ligneous or woody material which may with advantage be evaporated substantially to dryness, and then dried and carbonized in a suitable kiln in the presence of small or limited quantities of air. When this carbonization is conducted at high heat the resulting material is relatively free from hydrocarbons and highly and substantially uniformly porous in all directions so as to have a relatively light weight per cubic foot because of its high percentage of voids. This highly desirable carbonized material for producing decolorizing carbon is preferably leached to remove soluble inorganic matter and in some cases can advantageously be treated with weak acid solutions, such as sulphuric or hydrochloric acid and then washed and dried. Such special crude carbonized material is particularly adapted for use in this process; and when in substantially uniform granular form or in powdered condition, if desired, may preferably after such leaching or acid treatment, be treated with a solution of such salts as above referred to, which for best results are in chemically neutral or acid condition since in many cases carbonate and alkaline solutions do not seem to readily dissociate or produce upon the carbon finely divided deposited metallic substances or radicals. Solutions of magnesium, manganese or iron chlorides or sulphates or the corresponding acid salts such as the acid sulphates are desirable and the carbonaceous material may be soaked or treated with weak or moderately strong solutions of these salts which effects the incorporation or adsorption in the carbonaceous material of considerable proportions of the metallic radical of the salts while the acid radical of the salts is usually released in acid form. This physical union or possibly quasi chemical combination is sufficient in many cases so that repeated washing with water or even with strong acids sufficient to dissolve the metallic radicals of these salts is insufficient to cause their complete removal from the carbonized material. Increase of temperature facilitates this adsorption or incorporation of the catalyzing material or metallic radical, and for this reason it is usually desirable to heat or boil the carbonized material in the protective solution. Granular carbonized material of this character when boiled for ten minutes or so in a two percent solution for instance, of ferric sulphate adsorbed about five percent of iron on a metallic iron basis which could not be removed by repeated washing with hot water. Several percent or so of other metallic catalyzing radicals may be adsorbed or incorporated with such highly porous carbonized material by boiling the same with chlorides or sulphates of manganese, magnesium, iron or aluminum. For some purposes magnesium salts are decidedly advantageous because of their availability and efficiency in increasing the decolorizing power of the carbon under these conditions with moderate wastage during calcination, and because the resulting decolorizing carbon is free from staining or discoloring action when the material is used with sugary or other organic solutions containing tannic acid or similar compounds. In some cases also charcoal or other carbon may be used to replace more or less of the special porous carbonized dissolved organic material, but this generally gives decidedly less efficient results.

The calcining of the carbonized material and incorporated metallic protective and catalyzing material, which is very possibly deposited to a considerable extent in finely divided condition over the recessed or porous surface of the carbon, may be effected in a muffle furnace or other suitable heating furnace or retort, such as a rotary retort in which the material may be substantially uniformly heated at temperatures of 800° to 950° C. more or less, in the presence of suitable slightly oxidizing gases, such as diluted air or carbon-dioxide or mixtures thereof which seems to effect a regulated oxidizing action on the carbonized material and to form or produce very finely divided or activized carbon within its pores apparently through the reversible reaction by which carbon-monoxide produces or deposits exceedingly fine carbon when it is transformed into the carbon-dioxide condition. This action which seems to be considerably promoted by the presence in the porous carbon of such more or less combined metallic catalyzing material which in some cases seems to make possible this carbon-monoxide reduction at lower temperatures, is usually accompanied by a gradually wasting away or oxidation of the carbonaceous material which is very greatly retarded by the presence of these metallic protective catalyzing elements incorporated as above described. This finely disseminated metallic material seems to have a protective action which especially at high heats is of decided importance in preventing undesirable oxidation loss of the carbonized material. Under similar oxidizing conditions the oxidation or loss in weight of the carbonaceous material may be reduced to a third or a quarter of the amount of loss when no such protective catalyzing material is incorporated with the carbon, while at the same time the proportion of the deposited or activized carbon seems to remain about the same, or is even increased in some cases, as is evidenced by a corresponding increase in the decolorizing power of the carbon after such calcining treatment.

As an example of this action two samples of similar porous carbonized material of this general character were calcined side by side in a muffle furnace at a temperature of about 900° centigrade and after a thirty minute calcination the untreated carbon had lost about fifty percent of its weight while the sample of carbonized material which had previously been treated or incorporated with ferric chloride solution to deposit catalytic or protective iron therein only lost about twelve percent of its weight, the decolorizing power of the two carbons being practically identical in this case. The iron treated sample of carbon was then treated for a further period in the calcining furnace so that its total loss then amounted to about 48 percent, while the decolorizing power of this material was found to have increased about seventy-five percent as compared to the original calcined material of the two comparative samples. The difference in loss as between the untreated and the treated carbon increases materially with increase in the calcining temperature, and two similar samples of porous decolorizing carbon of this general character, one of which had been similarly treated with ferric chloride solution before being calcined at still higher temperature, lost about ten percent of its weight, while the untreated carbon under the same conditions lost eighty percent of its weight. What was still more remarkable, the decolorizing value of the treated carbon was found to be ninety percent greater per unit weight after this calcining treatment than the untreated carbonized material.

In some case where acid materials are to be decolorized, it is desirable to remove from the calcined and activized decolorizing carbon a considerable proportion at least of the incorporated metallic catalytic or protective material which has been used to prevent undesirable destructive oxidation during the calcination. For this purpose relatively strong acid treatment may be given to the calcined material which may be boiled in a solution of sulphuric or hydrochloric acid, for instance, and then after washing, the material may be dried and packaged for shipment and use. This acid purifying treatment may furthermore be used in connection with the treatment of further amounts of decolorizing carbon. Where, for instance, the original raw decolorizing carbon is boiled in a two percent solution of manganese sulphate the treated decolorizing carbon after washing and filtration separation may be dried and then calcined for thirty or forty minutes more or less at a temperature of about 900° centigrade after which it is of course cooled preferably out of contact with undesirable oxidizing material. The calcined decolorizing carbon may then be boiled in a five percent solution of sulphuric acid in order to remove the loosely combined manganese from the carbon and this solution may of course be used for treating other charges of the decolorizing carbon in this general way. After such acid washing treatment it is usually desirable to wash the carbonaceous material repeatedly and then dry and heat it to redness for a few minutes, although this is not in all cases necessary.

The decolorizing activity of these carbonized materials was tested according to the Wickenden-Hassler method described in the Journal of Industrial and Engineering Chemistry of June, 1916, volume 8, page 518. This decolorizing test involves the decolorizing of a standard solution of anilin red (Soudan III) in kerosene oil and 100 units of this standard test which is referred to as the kerosene red test corresponds to the complete decolorizing of a water solution containing .25 grams of anilin red of the grade technically known as scarlet R. The units of this standard scale are of substantially constant value throughout so that when 10 grams of decolorizing carbon have a decolorizing value of 100 units on this standard kerosene red scale, 5 grams of the same material would have a value of 50 units and other quantities in similar proportion. On this basis one sample of crude decolorizing carbon prepared from soda pulp waste liquor had a decolorizing value of about 70 units. Such material when treated with a two percent solution of ferric chloride and calcined for about thirty minutes at a temperature of approximately 900° centigrade had a decolorizing value of 186 units by this standard test and the material after being calcined at about this temperature for seventy minutes had a decolorizing value of 325 units on this scale. Other samples of generally similar decolorizing carbon calcined in connection with such protective or catalytic metallic material have produced decolorizing carbon having a value of considerably over 400 units on this scale. For purposes of comprision several other high grade decolorizing carbons which are sold on the market gave the following results according to this standard decolorizing test. Norit had a decolorizing value of about 140 units and Eponite had a value of about 120 units.

This invention has been described in connection with a number of illustrative embodiments, arrangements, materials, concentrations, methods, temperatures and times of treatments, to the details of which disclosure the invention is not of course to be limited, since what is claimed as new and what is desired to be secured by Letters Patent is set forth in the appended claims.

1. The process of increasing the decolorizing power of the porous carbonized residue of a vegetable solution, which comprises boiling said carbonized residue in a solution of magnesium chloride and effecting adsorption of the metallic radical thereof and calcining the incorporated material at a temperature of about 800 to 900 degrees centigrade in the presence of carbon-dioxide to greatly increase the decolorizing power of said carbonized material without excessive oxidation loss thereof.

2. The process of increasing the decolorizing power of porous adsorptive carbon, which comprises treating said carbon with a solution of magnesium salt, which is not an oxidizing agent, and effecting incorporation of the metallic radical thereof and calcining the incorporated material at a temperature of about 800 to 900 degrees centigrade in the presence of carbon-dioxide to greatly increase the decolorizing power of said carbon without excessive oxidation loss thereof.

3. The process of increasing the decolorizing power of the porous carbonized residue from substantially dissolved organic material, which comprises treating said residue with a hot solution of a non-basic salt of metallic protective material, which is not an oxidizing agent, and effecting adsorption of the metallic radical thereof and calcining the so treated carbon at a temperature of over 800 degrees centigrade in the presence of carbon-dioxide to greatly increase the decolorizing power of said carbon while the adsorptive metallic protective material minimizes oxidation loss.

4. The process of increasing the decolorizing power of porous adsorptive carbon, which comprises treating said carbon with a solution of a non-basic salt of metallic protective material, which is not an oxidizing agent, and effecting incorporation of the metallic radical thereof and calcining the so treated carbon at a temperature of over 800 degrees centigrade in the presence of carbon-dioxide to greatly increase the decolorizing power of said carbon while the adsorbed protective material minimizes oxidation loss.

5. The herein described carbon, having the structure and internal surface characteristics produced by treating the residue of a carbonized woody solution with a magnesium salt solution, which is not an oxidizing agent, and subjecting the so treated carbon to a temperature of 750° to 1000° C. in an atmosphere of limited oxidizing capacity, substantially as described.

6. The herein described carbon, having the structure and internal surface characteristics produced by treating a porous adsorbtive carbon with a solution of a magnesium salt which is not an oxidizing agent, and subjecting the so treated carbon to temperature of 750° to 1000° C. in an atmosphere of limited oxidizing capacity substantially as described.

7. The herein described carbon, having the structure and internal surface characteristics produced by treating the residue of a carbonized woody solution with a non-basic protective metallic salt solution which is not an oxidizing agent, and subjecting the so treated carbon to a temperature of 750° to 1000° C. in an atmosphere of limited oxidizing capacity, substantially as described.

8. The herein described carbon, having the structure and internal surface characteristics produced by treating a porous adsorptive carbon with a solution of a non-basic protective metallic salt, which is not an oxidizing agent, and subjecting the so treated carbon to temperature of 750° to 1000° C. in an atmosphere of limited oxidizing capacity substantially as described.

LEONARD WICKENDEN.